United States Patent
Redon et al.

(10) Patent No.: US 10,465,616 B2
(45) Date of Patent: Nov. 5, 2019

(54) DUAL-FUEL CONSTRUCTIONS FOR OPPOSED-PISTON ENGINES WITH SHAPED COMBUSTION CHAMBERS

(71) Applicant: ACHATES POWER, INC., San Diego, CA (US)

(72) Inventors: Fabien G. Redon, San Diego, CA (US); Gerhard Regner, San Diego, CA (US); Rishikesh Venugopal, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 446 days.

(21) Appl. No.: 14/910,174

(22) PCT Filed: Jul. 31, 2014

(86) PCT No.: PCT/US2014/049076
§ 371 (c)(1),
(2) Date: Feb. 4, 2016

(87) PCT Pub. No.: WO2015/020867
PCT Pub. Date: Feb. 12, 2015

(65) Prior Publication Data
US 2016/0195028 A1    Jul. 7, 2016

Related U.S. Application Data

(60) Provisional application No. 61/862,305, filed on Aug. 5, 2013.

(51) Int. Cl.
*F02B 3/00*        (2006.01)
*F02D 19/06*       (2006.01)
(Continued)

(52) U.S. Cl.
CPC ............ *F02D 19/0694* (2013.01); *F01B 7/14* (2013.01); *F02B 1/14* (2013.01); *F02B 7/06* (2013.01);
(Continued)

(58) Field of Classification Search
CPC ............ F02D 19/0694; F02D 19/0602; F02D 19/0642; F02D 19/0689; F02D 19/0692;
(Continued)

(56) References Cited

U.S. PATENT DOCUMENTS 673,160 A        4/1901   Diesel
2,767,691 A  *  10/1956   Mengelkamp ............ F02B 7/00
                                                                        123/1 A
(Continued)

FOREIGN PATENT DOCUMENTS

GB        527873           10/1940
GB        527873  A  *  10/1940   ................. 123/299
(Continued)

OTHER PUBLICATIONS

EPO Communication pursuant to Article 94(3) EPC, dated Jul. 20, 2017, for corresponding European Patent Application No. 14758003.9.
(Continued)

*Primary Examiner* — Hung Q Nguyen
*Assistant Examiner* — Anthony Donald Taylor, Jr.
(74) *Attorney, Agent, or Firm* — Terrance A. Meador

(57) ABSTRACT

A compression-ignited, opposed-piston engine equipped for multi-fuel operation includes at least one cylinder, a pair of pistons slidably disposed in the cylinder for opposing movement between respective bottom and top center locations, and spaced-apart intake and exhaust ports near respective ends of the cylinder. The pistons include end surfaces constructed to form a shaped combustion chamber when the (Continued)

pistons are near top center locations during a compression stroke of the engine. At least one gaseous fuel injector communicates with the bore of the cylinder through an injector site in the cylinder between the intake port and the exhaust port. At least one liquid fuel injector communicates with the bore through an injector site in the cylinder. A fuel injection system coupled to the at least one gaseous fuel injector and to the at least one liquid fuel injector is operable to cause the at least one gaseous fuel injector to inject a main charge of gaseous fuel when the pistons are between the bottom and top center locations and to cause the at least one liquid fuel injector to inject a pilot charge of liquid fuel.

8 Claims, 14 Drawing Sheets

(51) Int. Cl.
| F02D 41/30 | (2006.01) |
| F02B 7/06 | (2006.01) |
| F01B 7/14 | (2006.01) |
| F02B 75/28 | (2006.01) |
| F02D 41/00 | (2006.01) |
| F02B 23/06 | (2006.01) |
| F02B 1/14 | (2006.01) |
| F02M 35/10 | (2006.01) |
| F02M 43/04 | (2006.01) |

(52) U.S. Cl.
CPC ...... *F02B 23/0663* (2013.01); *F02B 23/0675* (2013.01); *F02B 75/28* (2013.01); *F02B 75/282* (2013.01); *F02D 19/0602* (2013.01); *F02D 19/0642* (2013.01); *F02D 19/0689* (2013.01); *F02D 19/0692* (2013.01); *F02D 41/0025* (2013.01); *F02D 41/3047* (2013.01); *F02M 35/10177* (2013.01); *F02M 43/04* (2013.01); *F02D 19/0647* (2013.01); *Y02T 10/125* (2013.01); *Y02T 10/36* (2013.01)

(58) Field of Classification Search
CPC ............. F02D 41/0025; F02D 41/3047; F02D 19/0647; F01B 7/14; F02B 1/14; F02B 7/06; F02B 23/0663; F02B 23/0675; F02B 75/28; F02B 75/282; F02M 35/10177; F02M 43/04; Y02T 10/125; Y02T 10/36
USPC .................................................. 123/299, 193
See application file for complete search history.

(56) References Cited

U.S. PATENT DOCUMENTS

| 4,700,672 | A | | 10/1987 | Baguena | |
| 4,714,198 | A | * | 12/1987 | Savkar | F23D 1/005 239/409 |
| 5,404,711 | A | * | 4/1995 | Rajput | F23D 14/02 239/400 |
| 6,032,617 | A | * | 3/2000 | Willi | F02B 43/00 123/27 GE |
| 6,170,443 | B1 | * | 1/2001 | Hofbauer | F02B 25/08 123/51 B |
| 6,276,334 | B1 | * | 8/2001 | Flynn | F02B 19/14 123/435 |
| 6,298,833 | B1 | * | 10/2001 | Douville | F02D 19/0684 123/27 GE |
| 6,336,598 | B1 | * | 1/2002 | Touchette | F02D 19/10 239/408 |
| 6,418,885 | B1 | * | 7/2002 | Paul | F02D 19/081 123/25 C |
| 7,270,108 | B2 | * | 9/2007 | Lemke | F02B 7/02 123/299 |
| 7,469,662 | B2 | * | 12/2008 | Thomas | F02B 19/12 123/258 |
| 8,677,950 | B2 | * | 3/2014 | Hofbauer | F01B 7/08 123/306 |
| 8,800,528 | B2 | * | 8/2014 | Fuqua | F01B 7/02 123/299 |
| 8,820,294 | B2 | * | 9/2014 | Fuqua | F01B 7/02 123/299 |
| 8,967,502 | B2 | * | 3/2015 | Kim | F02D 19/0684 123/27 GE |
| 8,997,710 | B2 | * | 4/2015 | Herold | F02B 23/0645 123/299 |
| 9,309,807 | B2 | * | 4/2016 | Burton | F01B 7/02 |
| 10,180,115 | B2 | | 1/2019 | Burton et al. | |
| 2011/0067671 | A1 | * | 3/2011 | Laimboeck | F02B 23/104 123/298 |
| 2011/0271932 | A1 | | 11/2011 | Fuqua et al. | |
| 2012/0073541 | A1 | | 3/2012 | Fuqua et al. | |
| 2013/0036999 | A1 | * | 2/2013 | Levy | F02B 75/282 123/299 |
| 2013/0213342 | A1 | | 8/2013 | Uzkan | |
| 2015/0013638 | A1 | * | 1/2015 | Ishida | F02B 25/04 123/299 |

FOREIGN PATENT DOCUMENTS

| JP | 55-023312 | 2/1980 |
| JP | 2008-534857 | 8/2008 |
| JP | 2013-024136 | 2/2013 |
| JP | 2013-124586 | 6/2013 |
| WO | WO 2006/105390 A1 | 10/2006 |
| WO | WO 2012/023975 A1 | 2/2012 |
| WO | WO-2012/158756 | 11/2012 |
| WO | WO-2012/158756 A1 | 11/2012 |
| WO | WO-2014/162143 A1 | 10/2014 |

OTHER PUBLICATIONS

Notification of First Office Action dated Nov. 3, 2017, by the State Intellectual Property Office of PRC, for Chinese patent application No. 201480045023.2.
EPO Communication pursuant to Article 94(3) EPC, dated Dec. 14, 2016, for corresponding European Patent Application No. 14758003.9.
International Search Report and Written Opinion for PCT application PCT/US2014/049076, dated Jan. 5, 2015.
Office Action dated Feb. 27, 2018 for Japanese Patent application No. 2016-533335.
EPO Communication pursuant to Article 94(3) EPC, dated Apr. 30, 2018, for corresponding European Patent Application No. 14758003.9.
Notification of Reasons of Rejection dated Oct. 9, 2018, for Japanese Patent Application No. 2016-533335.
Notification of Second Office Action dated Aug. 30, 2018, for corresponding Chinese Patent Application No. 201480045023.2.
Notification of Third Office Action dated Apr. 29, 2019, for corresponding Chinese Patent Application No. 201480045023.2.
Notice of Allowance, dated Jan. 29, 2019, issued by the Japanese Patent Office, for Japanese Patent Application No. 2016-533335.

\* cited by examiner

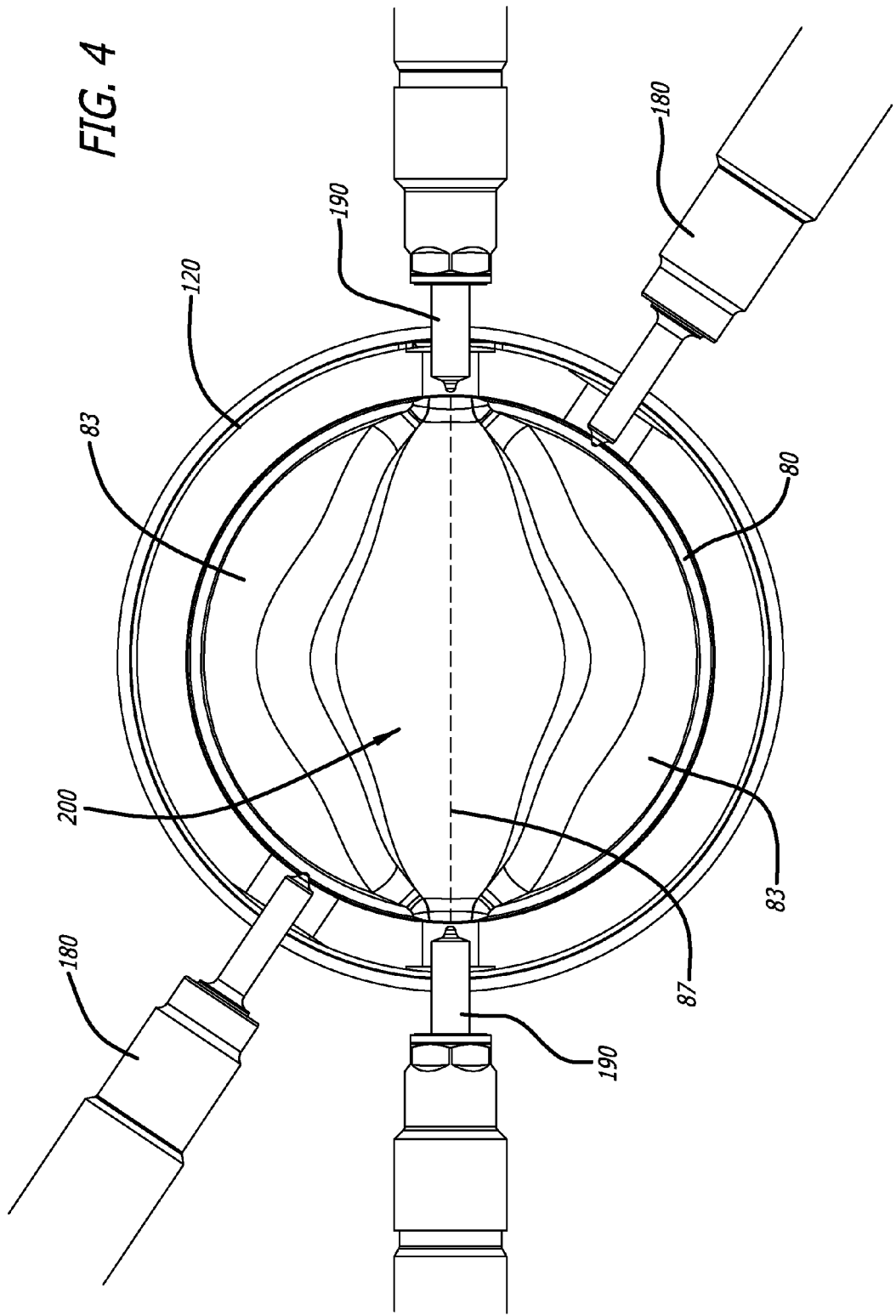

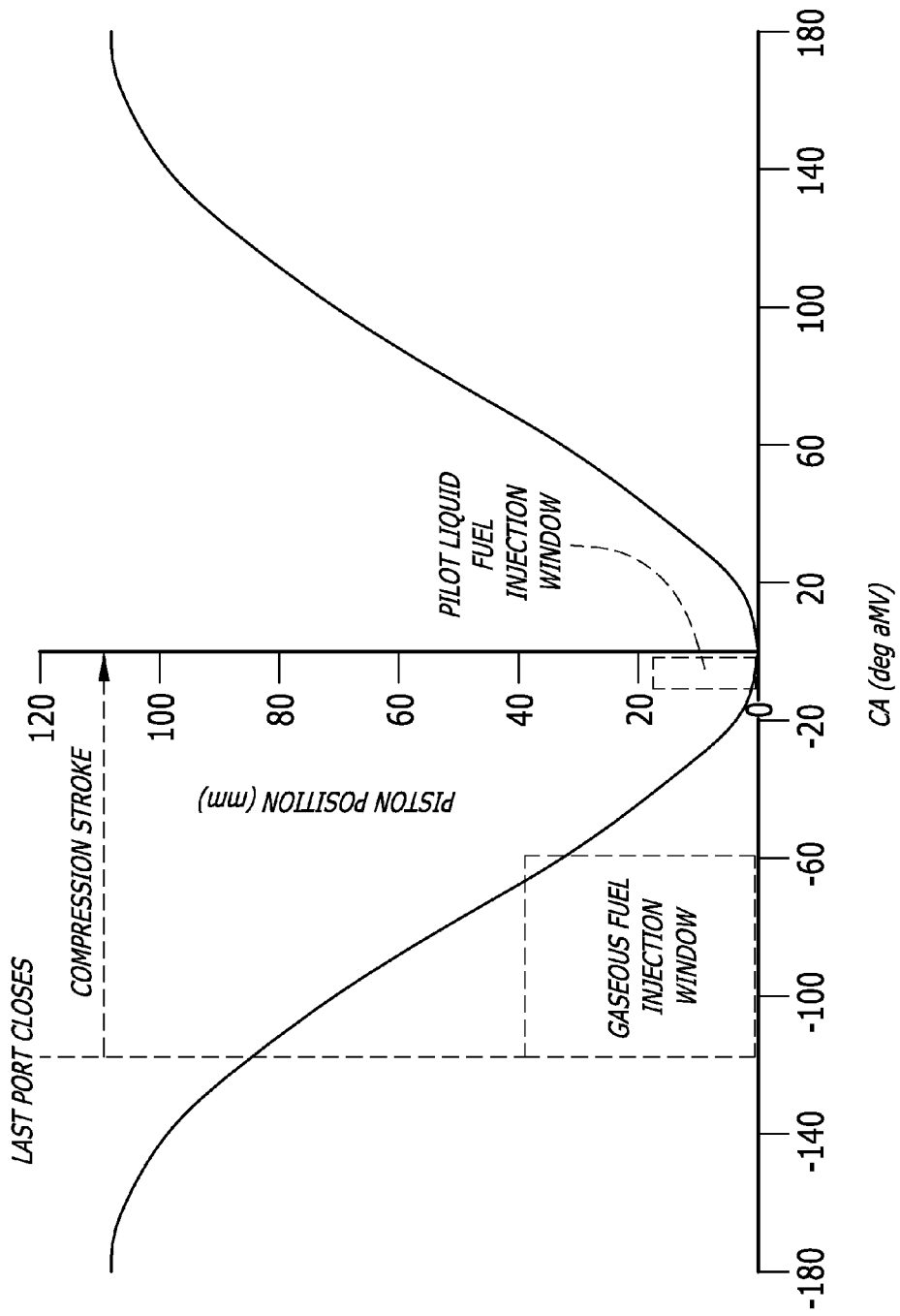

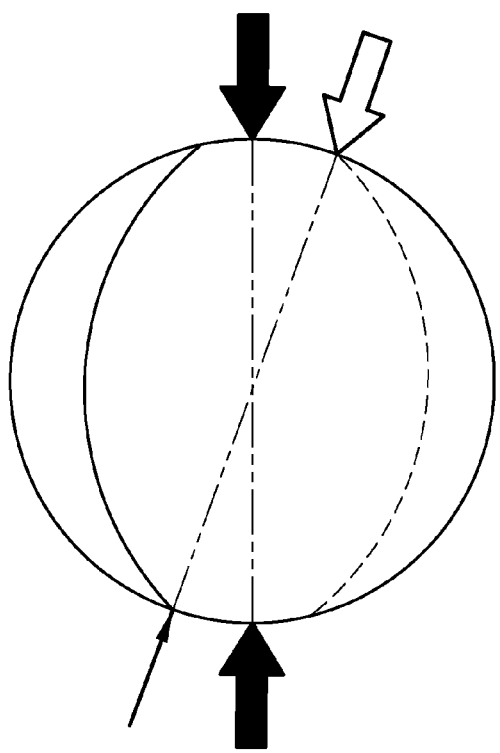
*FIG. 7A*
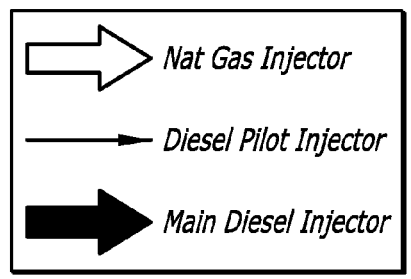
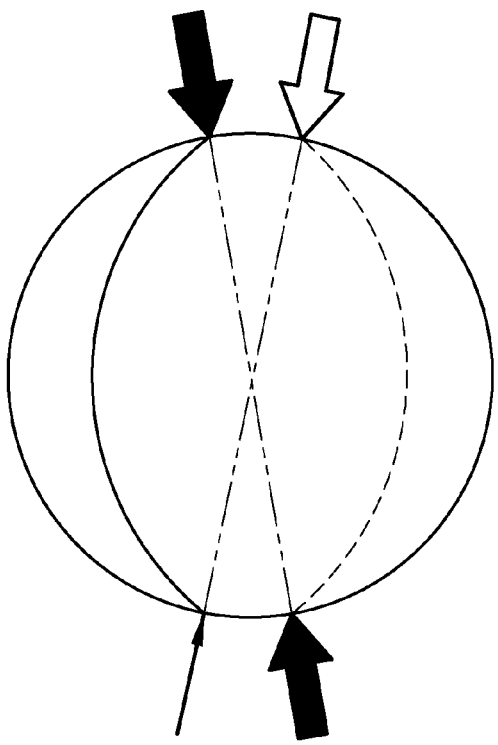
*FIG. 7B*
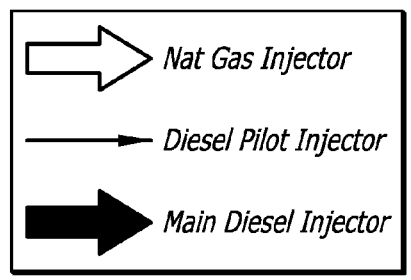

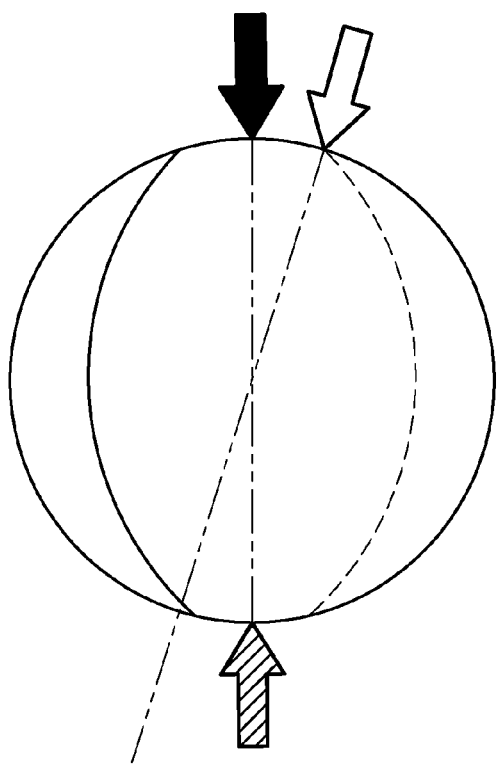
*FIG. 10A*
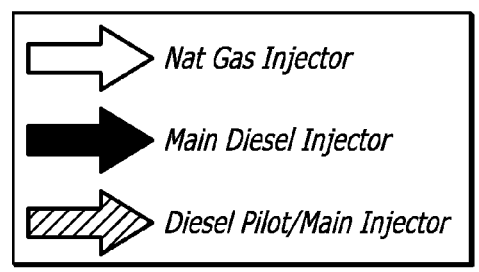
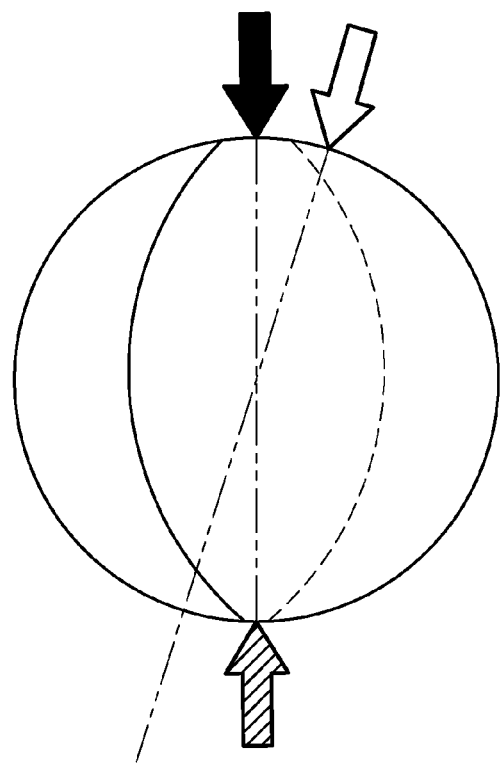
*FIG. 10B*
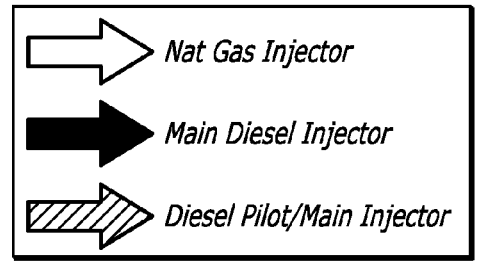

Combine dual fuel Injector

Combined Dual fuel with pilot

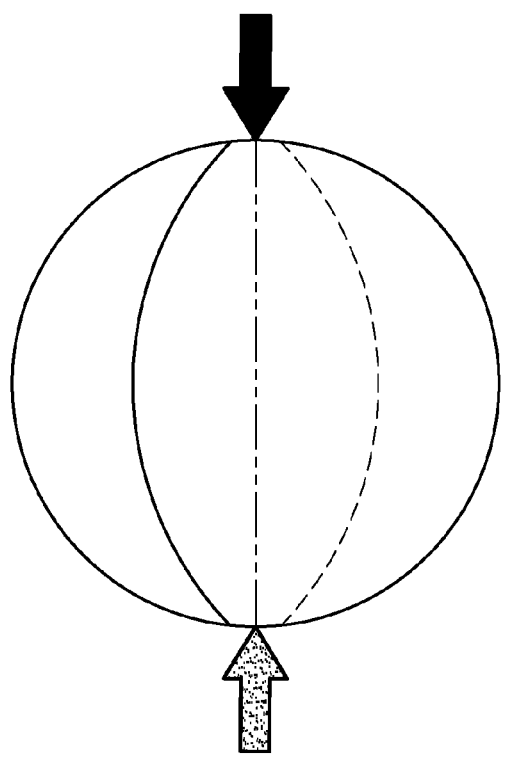
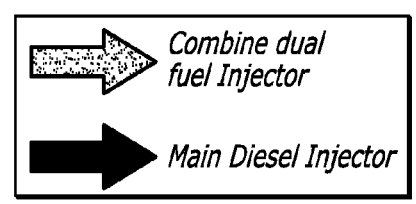
*FIG. 14A*
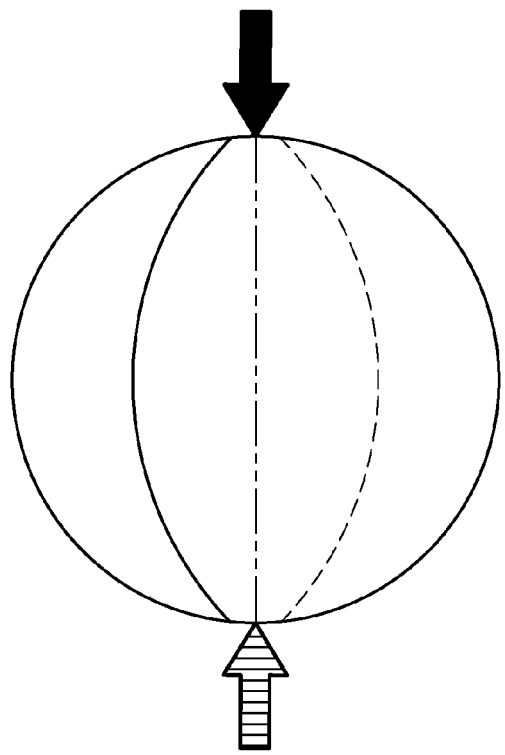
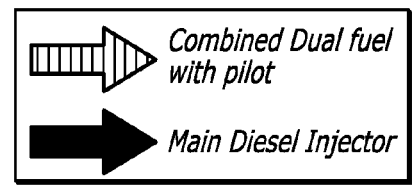
*FIG. 14B*

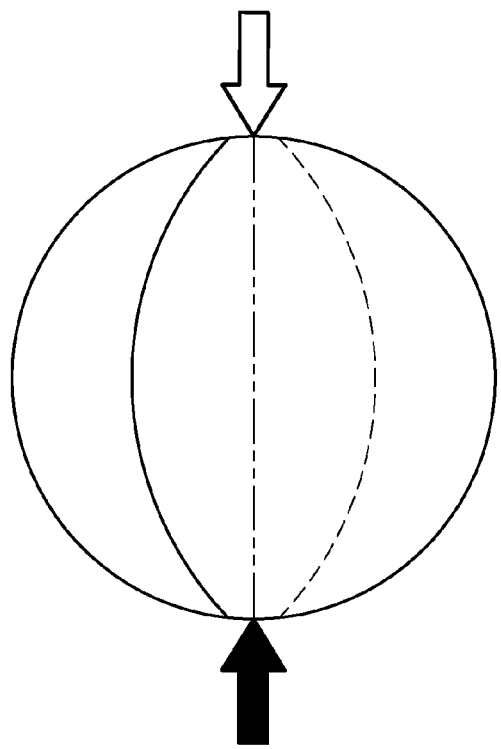
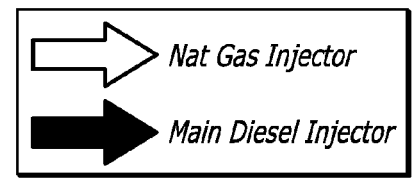
FIG. 15A
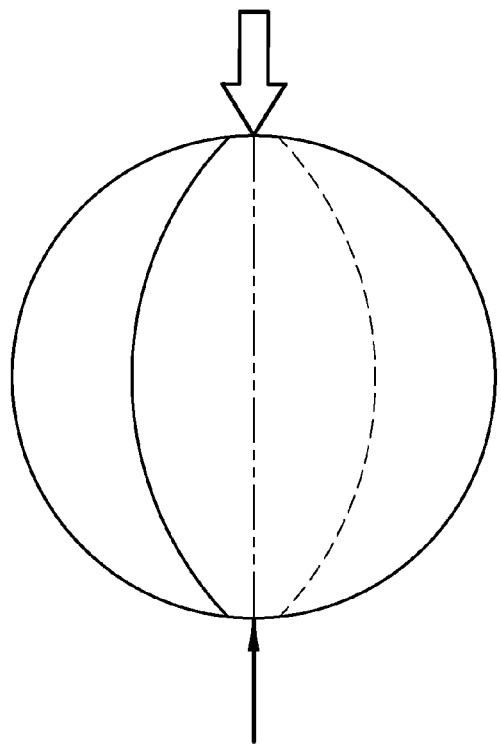
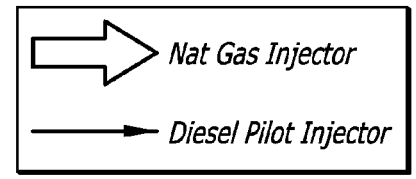
FIG. 15B

DUAL-FUEL CONSTRUCTIONS FOR OPPOSED-PISTON ENGINES WITH SHAPED COMBUSTION CHAMBERS

RELATED APPLICATIONS

This application includes subject matter related to the subject matter of U.S. application Ser. No. 13/136,954, filed Aug. 15, 2011, and published as US 2012/0073541 on 03129/2012.

BACKGROUND

The field relates generally to use of multi-fuel combustion to power an engine of the compression-ignition type. More particularly, the field relates to a two-stroke cycle opposed-piston engine equipped for injection of a main charge of gaseous fuel into a cylinder during a compression stroke, before the pistons reach top center (TC), together with injection of a pilot charge of liquid fuel into a shaped combustion chamber to ignite the main charge.

For reasons of performance and cost it can be advantageous to incorporate more than one fuel into the combustion system of a high power density engine. For example, the operating costs of a compression-ignition engine may be reduced by use of a gaseous fuel (such as natural gas (NG)) to provide the main fuel charge and small quantities of a more reactive liquid fuel (such as diesel) to ignite the main fuel charge.

In a conventional compression-ignition (CI) engine a single piston is slidably disposed in a cylinder. The piston moves in the cylinder between a top center location where the crown of the piston is closest to the cylinder head, and a bottom center (BC) position where the crown is furthest from the cylinder head. Air introduced into the cylinder is compressed by the piston as it moves toward TC during its compression stroke. Compression of the air raises its temperature. Fuel is injected into the heated air at a time when the piston nears the top of its compression stroke. The elevated temperature of the compressed air causes autoignition of the fuel whereby the fuel self ignites and burns, releasing energy and driving the piston toward BC in a power stroke.

In a two-stroke cycle, opposed-piston engine built for compression ignition, two pistons are slidably disposed crown-to-crown in the bore of a cylinder having intake and exhaust ports near BC of each piston. During engine operation, the ports are controlled by movement of the pistons as they move in opposition in the bore, toward and away from each other, between their TC and BC positions. Air introduced into the cylinder is compressed by the pistons as they move toward their respective TC positions during a compression stroke. The engine typically has one or more liquid fuel injectors mounted to the cylinder at a location near the TC position of the piston crowns. The injected fuel mixes with the compressed air and the air/fuel mixture autoignites, driving the pistons away from each other in a power stroke toward their BC positions.

Commonly-assigned U.S. Pat. No. 7,270,108 describes a two-stroke cycle opposed-piston engine in which injection of a main charge of liquid fuel early in the compression stroke provides more complete evaporation of the fuel by the time the stroke is nearly complete. Injection of a pilot charge of fuel into the compressed air/fuel mixture near TC of the pistons activates ignition of the main charge. Control of the pilot injection enables precise timing of ignition of the main fuel charge.

It is desirable to promote turbulence in the bulk motion of charge air in the cylinder bore during the compression stroke in order to mix air with fuel in preparation for combustion. Elements of charge air motion that contribute to turbulence include swirl and squish flow. In some aspects, the end surfaces of the piston crowns are made with shapes and contours designed to interact with these elements in order to produce additional bulk motion components such as tumble. Relatedly, combustion chambers have been constructed to produce complex turbulence so as increase the homogeneity of the mixing process. See, for example, the combustion chamber constructions described in US 2011/0271932 and WO 2012/158756.

As an opposed-piston engine runs, a combustion chamber is formed once each cycle of engine operation when the pistons meet near the center of the cylinder. Typically, an injector, or more than one injector, is mounted to the cylinder at, or very near, TC of the pistons. As a result, the injector heads are located in close proximity to the combustion chamber formed between the crowns of the pistons when the pistons are at TC. To avoid any possible interference problems between the injector heads and the piston crowns, careful design planning is necessary. When multiple injectors, (perhaps more than two) are to be used, injector locations are critical, especially in view of constraints imposed by combustion chamber constructions. This problem may be compounded in an opposed-piston engine built for multi-fuel combustion if different types of fuel delivery devices are incorporated into the fuel delivery system.

SUMMARY

A method of operating a multi-fuel opposed-piston compression-ignition engine with a cylinder, a pair of opposed pistons in the bore of the cylinder and spaced-apart intake and exhaust ports controlled by the pistons, includes introducing air into the cylinder between the pistons, moving the pistons toward each other in a compression stroke, and injecting a main charge of gaseous fuel into the cylinder between the pistons through a first injection site on the cylinder between the intake port and the exhaust port. In response to movement of the pistons, the main charge of gaseous fuel is mixed and compressed with charge air. A shaped combustion chamber containing a compressed mixture of gaseous fuel and charge air is formed between the end surfaces of the pistons as they approach respective top center positions. A pilot charge of liquid fuel operable to ignite the compressed mixture of gaseous fuel and air is injected into the combustion chamber through a second injection site on the cylinder.

An opposed-piston compression-ignition engine includes a cylinder, a pair of opposing pistons slidably disposed in the cylinder, spaced-apart intake and exhaust ports near respective ends of the cylinder, at least one gaseous fuel injector communicating with the bore of the cylinder through an injector site in the cylinder between the intake port and the exhaust port, and at least one liquid fuel injector in the cylinder in communication with a shaped combustion chamber formed in the cylinder when the pistons are near top center locations. A fuel injection system coupled to the at least one gaseous fuel injector and to the at least one liquid fuel injector is operative to cause the at least one gaseous fuel injector to inject a gaseous fuel into the cylinder when the pistons are between bottom and top locations and to cause the at least one pilot fuel injector to inject a liquid fuel into the combustion chamber when the pistons are near top center locations.

BRIEF DESCRIPTION OF THE DRAWINGS

FIG. 4 is an end view of the piston FIG. 2A showing an end surface at or near its TC location.

FIG. 6 is a graph illustrating control of the fuel injection system of FIG. 5.

FIGS. 7A and 7B are conceptual schematic drawings illustrating a first alternative embodiment of a multi-fuel construction for a compression-ignited opposed-piston engine.

FIGS. 10A and 10B are conceptual schematic drawings illustrating a fourth alternative embodiment of a multi-fuel construction for a compression-ignited opposed-piston engine.

FIGS. 14A and 14B are conceptual schematic drawings illustrating an eighth alternative embodiment of a multi-fuel construction for a compression-ignited opposed-piston engine.

FIGS. 15A and 15B are conceptual schematic drawings illustrating a ninth alternative embodiment of a multi-fuel construction for a compression-ignited opposed-piston engine.

DETAILED DESCRIPTION OF PREFERRED EMBODIMENTS

A two-stroke cycle engine is an internal combustion engine that completes a power cycle with a single complete rotation of a crankshaft and two strokes of a piston connected to the crankshaft. One example of a two-stroke cycle engine is an opposed-piston engine in which two pistons are disposed in opposition in the bore of a cylinder for reciprocating movement in opposing directions. The cylinder has longitudinally-spaced intake and exhaust ports that are located near respective ends of the cylinder. Each of the opposed pistons controls one of the ports, opening the port as it moves to a bottom center (BC) location, and closing the port as it moves from BC toward a top center (TC) location. One of the ports provides passage for the products of combustion out of the bore, the other serves to admit charge air into the bore; these are respectively termed the "exhaust" and "intake" ports.

Figure 1:
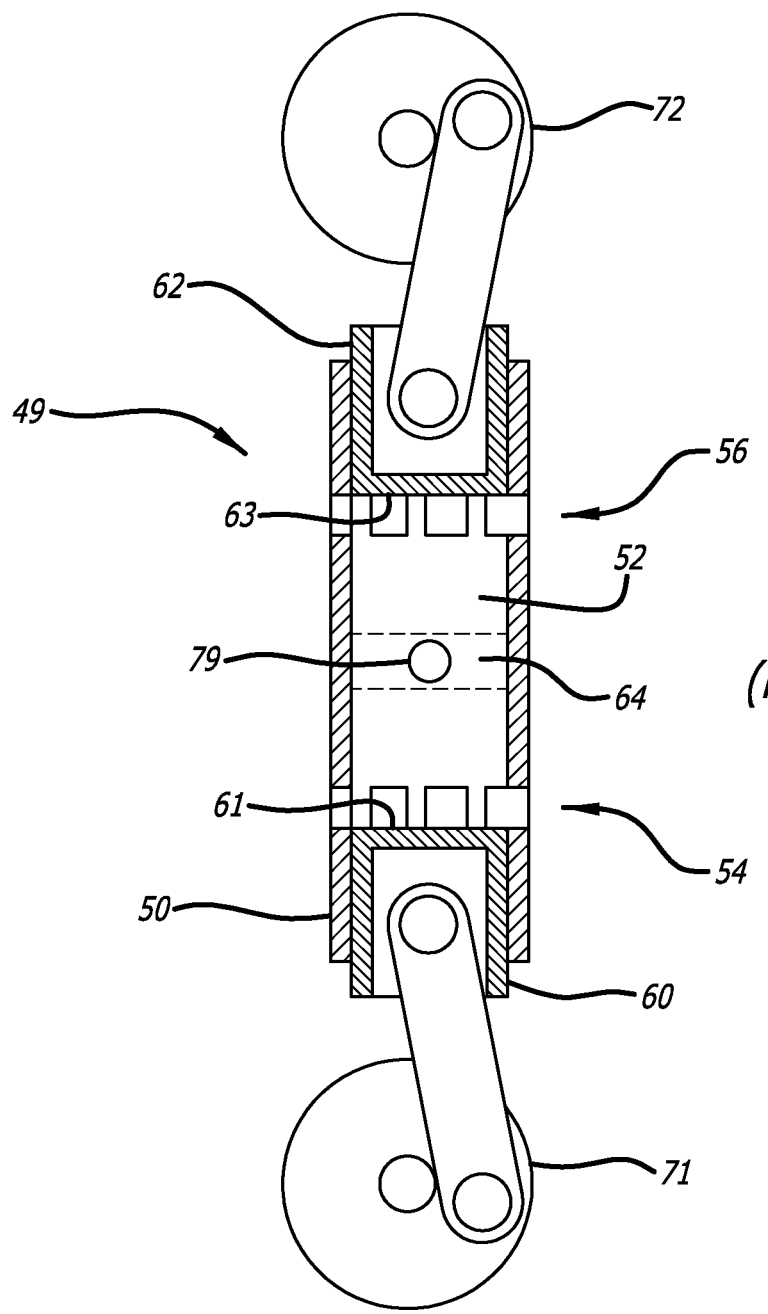
FIG. 1 is schematic illustration of an opposed-piston engine and is properly labeled "Prior Art".

FIG. 1 represents a two-stroke cycle opposed-piston engine 49 having at least one ported cylinder 50. For example, the engine may have one ported cylinder, two ported cylinders, three ported cylinders, or four or more ported cylinders. Each ported cylinder 50 has a bore 52 and longitudinally-spaced intake and exhaust ports 54 and 56 formed or machined in respective ends of a cylinder wall. Each of the intake and exhaust ports 54 and 56 includes one or more circumferential arrays of openings in which adjacent openings are separated by a solid bridge. In some descriptions, each opening is referred to as a "port"; however, the construction of a circumferential array of such "ports" is no different than the port constructions shown in FIG. 1. In the example shown, the engine 49 further includes two crankshafts 71 and 72. The intake and exhaust pistons 60 and 62 are slidably disposed in the bore 52 with their end surfaces 61 and 63 opposing one another. The intake pistons 60 are coupled to the crankshaft 71, and the exhaust pistons are coupled to the crankshaft 72.

FIG. 1 shows the pistons at or near respective BC locations. As the pistons 60 and 62 move toward TC, a combustion chamber is defined in the bore 52 between the end surfaces 61 and 63 of the pistons; in the figure, the combustion chamber 64 is represented by the area between the dashed lines. Fuel is injected directly into the combustion chamber through at least one fuel injector nozzle 79 positioned in an opening through the sidewall of a cylinder 50. The fuel mixes with charge air admitted into the bore through the intake port 54 As the air-fuel mixture is compressed between the end surfaces it reaches a temperature that causes combustion.

Combustion Chamber Shape

It is desirable to utilize shaped combustion chamber constructions that are designed to induce complex turbulence in the bulk motion of charge air in the cylinder bore during the compression stroke in order to mix air with fuel in preparation for combustion. In this regard, pistons having shapes and contours in their end surfaces interact with swirl and inwardly-directed squish to produce additional bulk motion elements such as tumble. See, for example, the shaped combustion chamber configurations described in US 2011/0271932, WO 2012/158756, and U.S. Ser. No. 13/843, 686. A representative combustion chamber shaped for promoting turbulent bulk charge air motion in a multi-fuel opposed-piston engine is formed between the end surfaces of the pair of opposed pistons illustrated in FIGS. 2A and 2B.

Figure 2A:
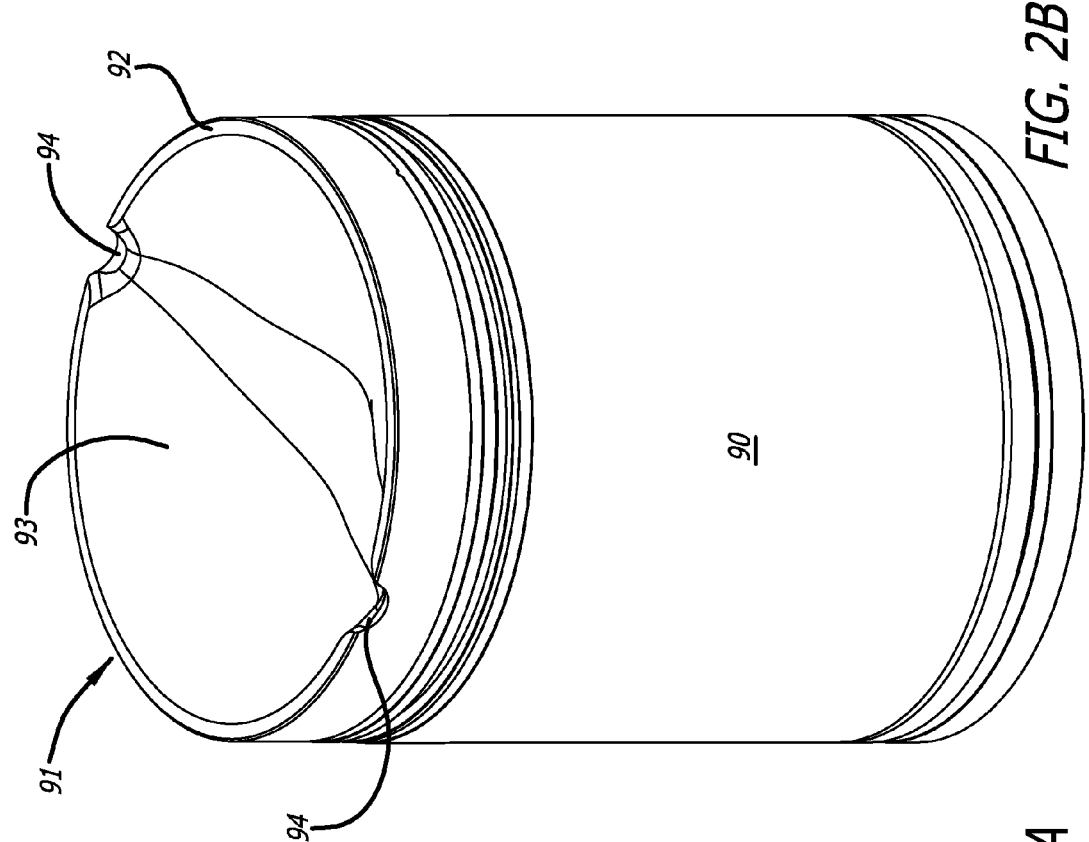
FIGS. 2A and 2B are isometric illustrations of a pair of opposed pistons.
Figure 2B:
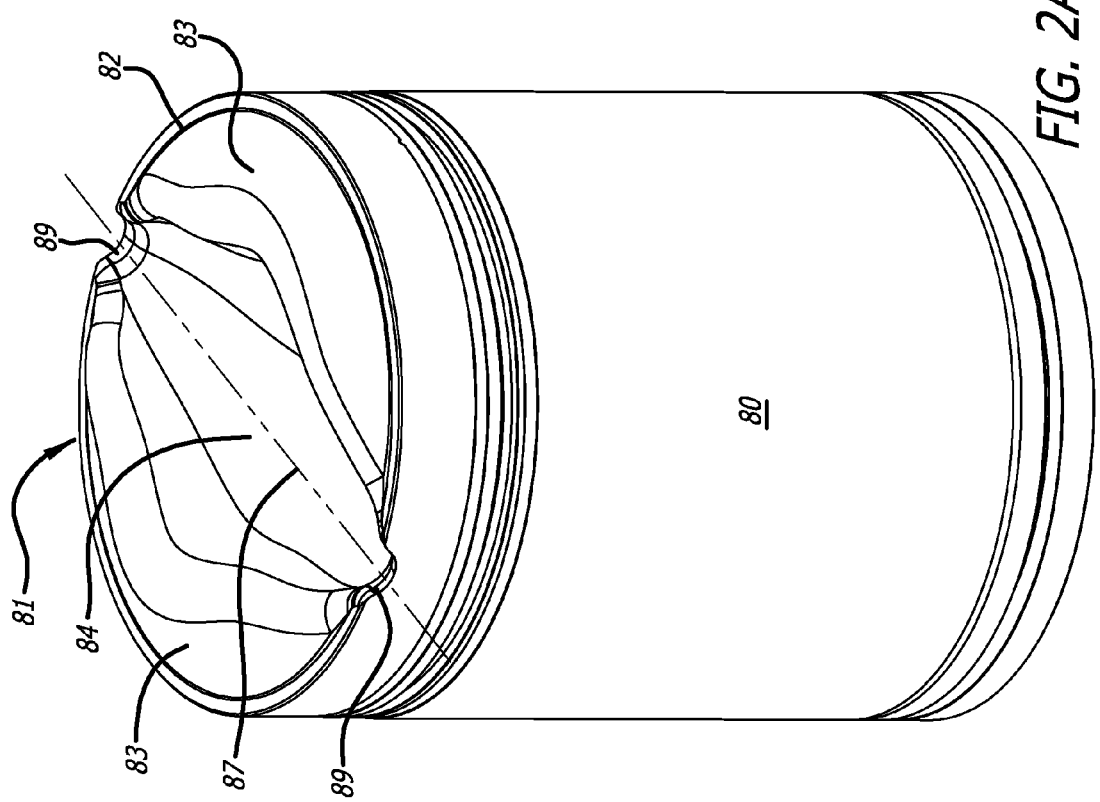

In FIGS. 2A and 2B pistons 80 and 90 include piston crowns 81 and 91, respectively, with complementary piston end surface structures for defining a combustion chamber construction in a ported cylinder of an opposed-piston engine. The crown 81 has an end surface structure including a periphery 82 surrounding a convex portion 83 protruding outwardly from the interior of the piston 80 and an elongated cleft 84 extending in a diametrical direction of the piston. As per FIG. 2A, the elongated cleft 84 has a line of symmetry 87 that is collinear with a diameter of the piston's end surface. Diametrically opposed notches 89 formed in the periphery 82 are aligned with the line of symmetry 87 and open into respective ends of the cleft 84. As per FIG. 2B the crown 91 has an end surface structure including a periphery 92 surrounding a bowl 93 defining a concave surface curving away from the periphery 92 toward the interior of the piston 90. Diametrically opposed notches 94 are formed in the periphery 92 and the outer part of the bowl 93.

Figure 3A:
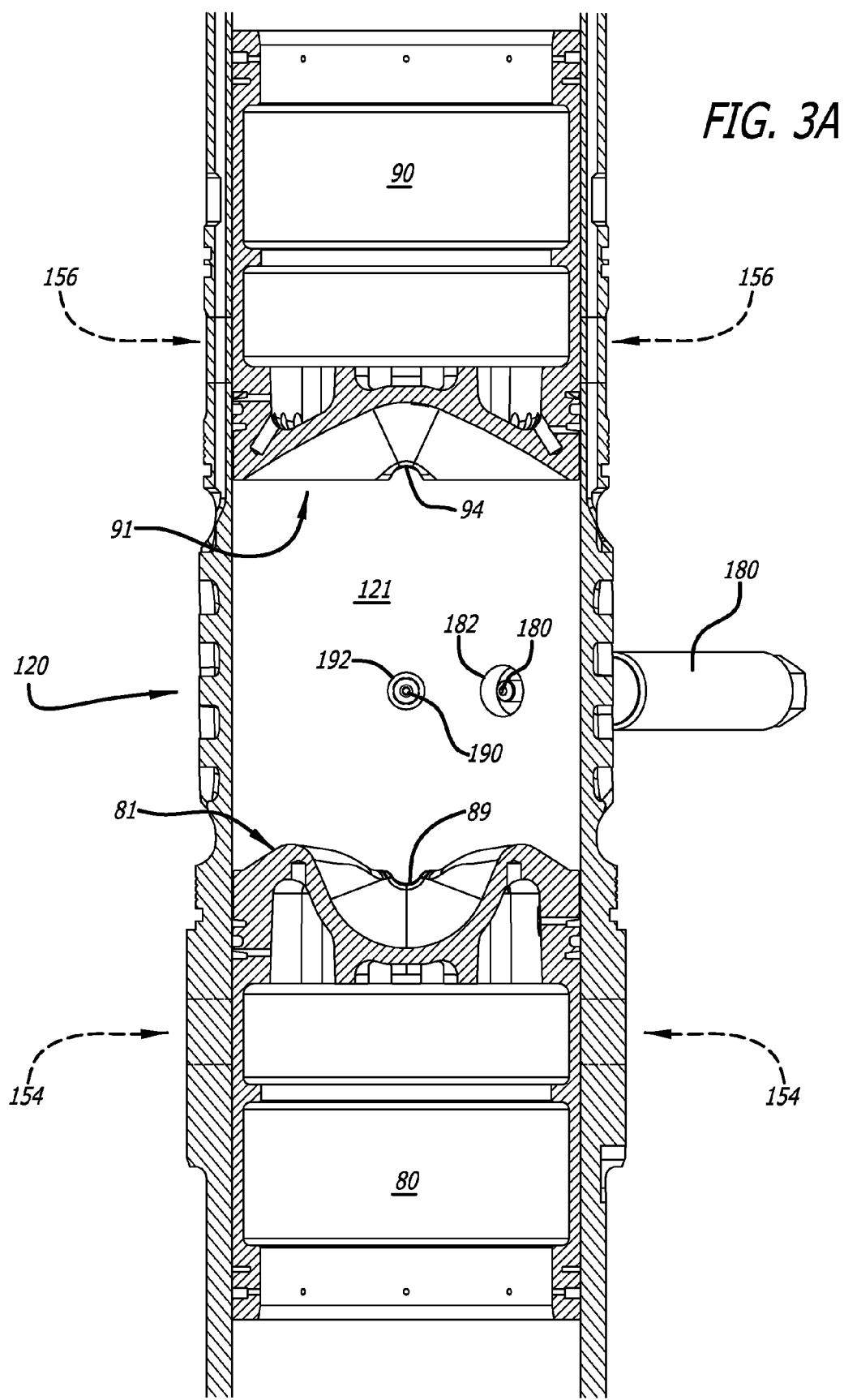
FIG. 3A is a side sectional view of a cylinder of an opposed-piston engine equipped for multi-fuel operation showing opposed pistons between BC and TC locations in a compression stroke.
Figure 3B:
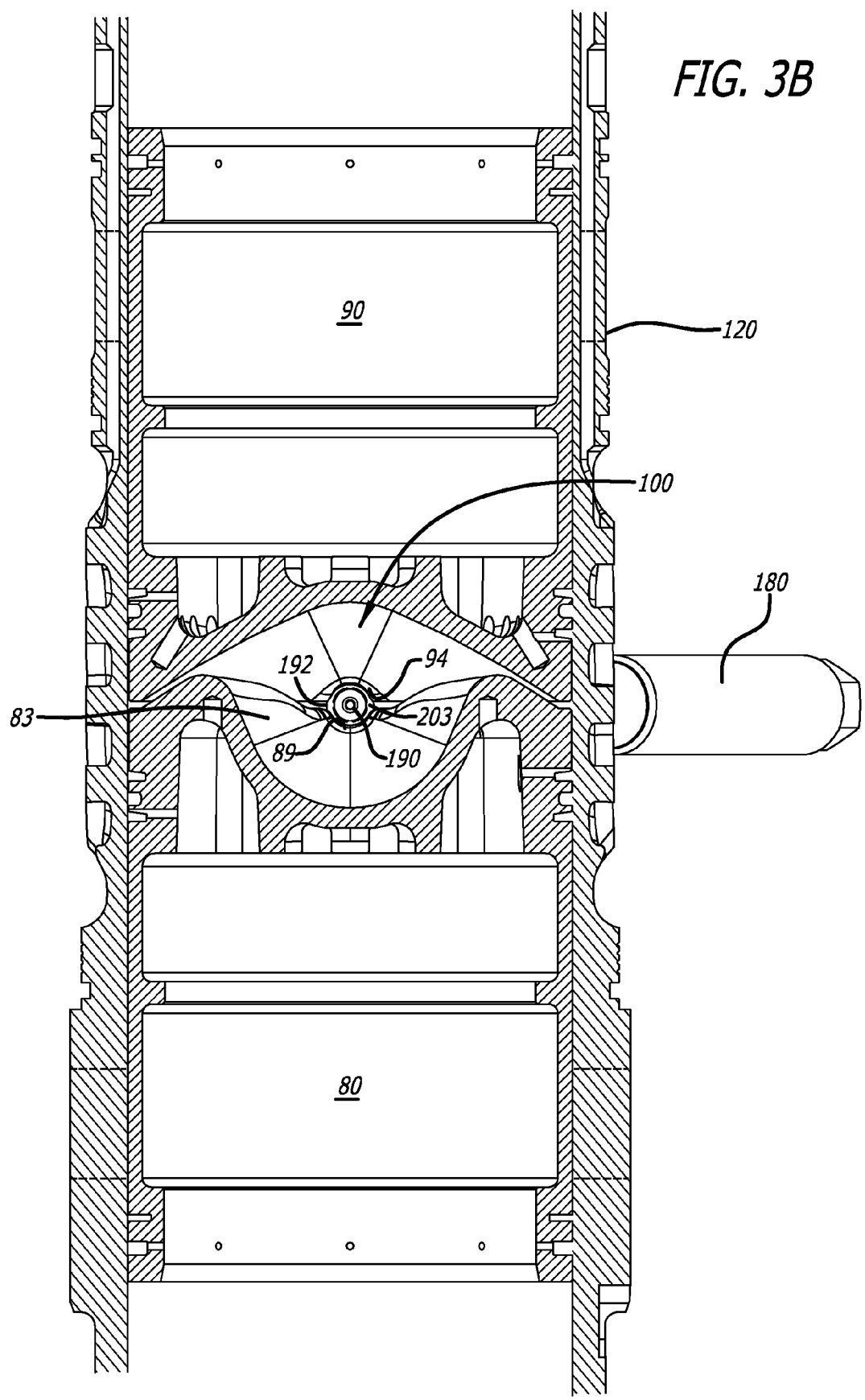
FIG. 3B is a side sectional view of the cylinder of FIG. 3A showing the opposed pistons near respective TC locations later in the compression stroke.

Referring now to FIG. 3A, the two pistons 80 and 90 including crowns 81 and 91 are shown between respective BC and TC locations within a ported cylinder 120. The pistons are rotationally oriented in the bore 121 of the cylinder 120 so as to align their end surfaces in complement; that is to say, the notches 89 are aligned with the notches 94, and each notch pair 89, 94 is positioned in alignment with an injector port 192 that opens through the sidewall of the cylinder 120. Charge air enters the cylinder 120 through the intake port 154 as exhaust products flow out of the cylinder through the exhaust port 156. For purposes of scavenging and air/fuel mixing, the charge air is caused to swirl as it passes through the intake port. As the pistons 80 and 90 move from BC toward TC as per FIG. 3A, the intake and exhaust ports 154 and 156 are closed and the swirling charge air is increasingly compressed between the end surfaces of the crowns 81, 91. With reference to FIGS. 2A, 2B and 3B, as the pistons 80 and 90 move through their respective TC locations, the opposing convex/cleft-concave surface portions 83, 84, and 93 mesh with one another to form a combustion chamber 100 between the end surfaces of the crowns 81 and 91. As per the figures, given the configuration of the cleft 84, the combustion chamber space defined between the end surfaces of the pistons 80 and 90 is symmetrical with respect to a plane of symmetry containing the axis 87, and has a shape that is, or is very close to, an elongated ellipsoid that transitions to opposed pairs of notches defining injection openings at its ends.

With reference to FIG. 3B, as the pistons 80 and 90 approach TC positions, compressed charge air flows from the peripheries 82 and 92, through opposing curved squish regions defined between concave-convex surface portions 83 and 93. At the same time, compressed air in the bore of the cylinder 120 continues to swirl. The interactions of swirl and squish flow produce tumble at each end of the combustion chamber 100.

Multi-Fuel Construction and Operation

A compression-ignition, opposed-piston engine as thus far described is equipped for multi-fuel operation by provision, for each cylinder, of a plurality of fuel injectors that enable injection of at least two types of fuels through a plurality of injection sites along the sidewall of the cylinder. In some aspects, multi-fuel operation includes a gaseous fuel, a liquid fuel, and, possibly, other fuels. In the examples and embodiments to be described, the fuels include natural gas (NG) and diesel, although this is for illustration only and is not intended to be limiting.

Detailed Embodiment with Opposed Pilot Injectors

FIGS. 3A, 3B and 4 illustrate a detailed embodiment of a compression-ignition opposed-piston engine equipped for multi-fuel operation. Although specific arrangements and operations of fuel injectors with respect to a particular combustion chamber shape are shown in these figures, the applicant intends the embodiment to be illustrative and to establish a basis for more abstract descriptions of alternate embodiments. In this description, term "main injection" is defined as an injection of fuel in a quantity sufficient to produce combustion, and the term "pilot injection" is defined as injection of a small quantity of fuel sufficient to ignite the main injection quantity. In many instances, the main injection occurs before the pilot injection. However there are cases in which a pilot injection may be initiated before main injection starts. The term "main charge" refers to the fuel injected by a main injection, and the term "pilot charge" refers to the fuel injected by a pilot injection.

As per FIGS. 3A, 3B, and 4, two pairs of fuel injectors are shown. A first pair includes fuel injectors 180, which are used for main injection, and a second pair includes fuel injectors 190, which are used for pilot injection.

In some aspects shown in FIGS. 3A and 4, the main injectors 180 are positioned to inject main charges of NG in opposing radial directions of the cylinder bore 121 through injection ports 182 in the sidewall of the cylinder 120. According to this detailed embodiment, the radial directions of the main injections are transverse to the line of symmetry 87 of combustion chamber 100.

In some aspects also shown in FIGS. 3A an 4, the pilot injectors 190 are positioned to inject pilot charges of diesel fuel in opposing radial directions of the cylinder bore 121 through injection ports 192 in the sidewall of the cylinder 120. According to this detailed embodiment, the combustion chamber 100 is essentially centered with respect to the longitudinal axes of the cylinder 120 and the pistons 80 and 90. When the pistons 80 and 90 are near TC, each pair of aligned notches 89, 94 defines a respective injection opening 203 (best seen in FIG. 3B) into the combustion chamber cavity 100. Each injection opening 203 is located at or near one end of the combustion chamber 100, aligned with the line of symmetry 87 thereof and with the injection ports 192. Pilot charges are injected from the two opposing pilot injectors 190 through the injection openings and the pilot fuel plumes are confined in the combustion chamber 100.

Figure 5:
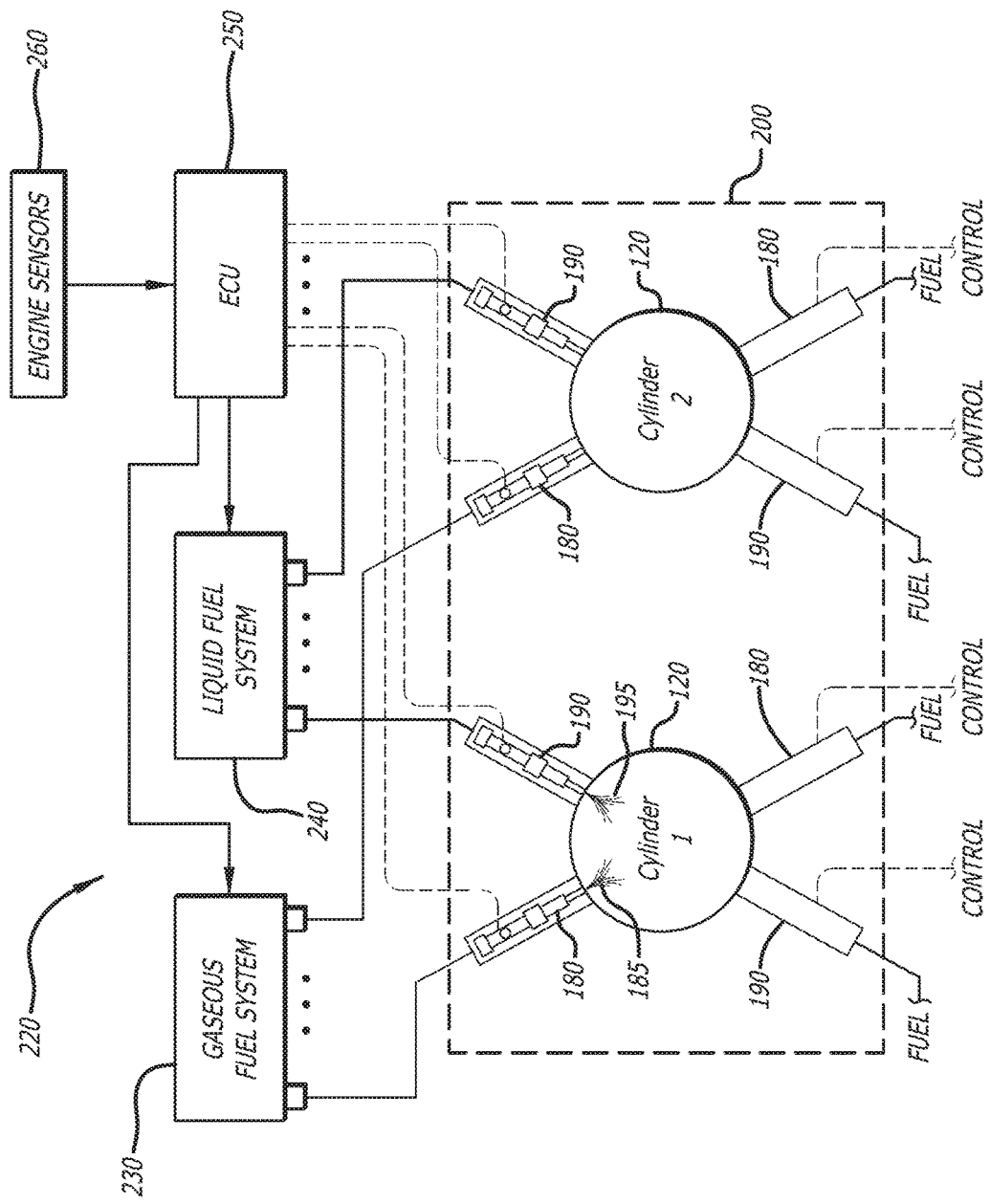
FIG. 5 is a block diagram of a fuel injection system of an opposed-piston engine equipped for multi-fuel operation.

Multi-fuel operation of the compression-ignition, opposed-piston engine as thus far described is illustrated in FIGS. 5 and 6. As per FIG. 5, one or more ported cylinders 120 constructed and equipped as described with respect to FIGS. 3A, 3B, and 4 are supported in an engine block or spar 200. The engine is equipped with a fuel injection system 220 including a gaseous fuel supply system 230, a liquid fuel supply system 240, and an engine control unit (ECU) 250. The main injectors 180 are operatively connected to the gaseous fuel system 230 and the pilot injectors 190 are operatively connected to the liquid fuel system 240. The ECU 250 is connected to detect engine operating parameters via engine sensors 260. The ECU 250 is also connected to control the operations of the injectors 180 and 190 and the fuel systems 230 and 240.

Control of the fuel injection system 220 by the ECU 250 for the embodiment shown in FIG. 5 is illustrated in the chart of FIG. 6. As per FIG. 6, engine operations are synchronized to a timing event referred to as the "last port closure" (LPC), which signifies closure of both the intake and exhaust ports and commencement of the compression stroke. Engine cycle time is indicated by the degree of rotation of the crankshaft connected to the piston which causes the last port to close; the degree of rotation is indicated by an angle of rotation (CA) of that crankshaft. As CA advances through the compression stroke, the distance changes ("piston position") between the periphery (82 or 92 in FIGS. 2A and 2B) of the piston and an orthogonal plane through the cylinder containing an injection axis. According to the example portrayed in the chart, the last port closes at or about CA=−120°, which is about 60° beyond the piston's BC location, and the piston passes through its TC location at about 0°. Preferably, but not necessarily, one or more main injections for a cylinder occur in a gaseous fuel injection window beginning at last port closing of about 80° width. Note that minimum combustion chamber volume occurs as the pistons pass through their respective TC locations, and it is at or near this point that a pilot injection has its greatest effect in this embodiment. According to the example portrayed in the chart, one or more pilot injections occur in a pilot liquid fuel window having a period of from about 10 degrees to about 2 degrees of crankshaft angle preceding minimum combustion chamber volume.

Alternate Embodiments

Figure 9:
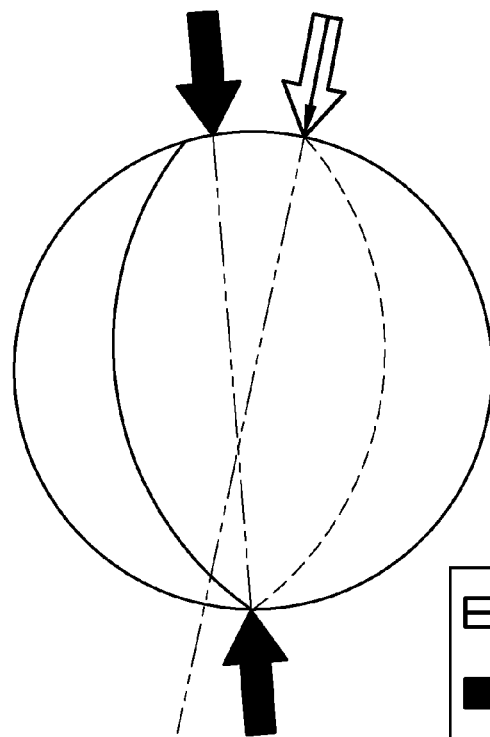
FIG. 9 is a conceptual schematic drawing illustrating a third alternative embodiment of multi-fuel construction for a compression-ignited opposed-piston engine.
Figure 11:
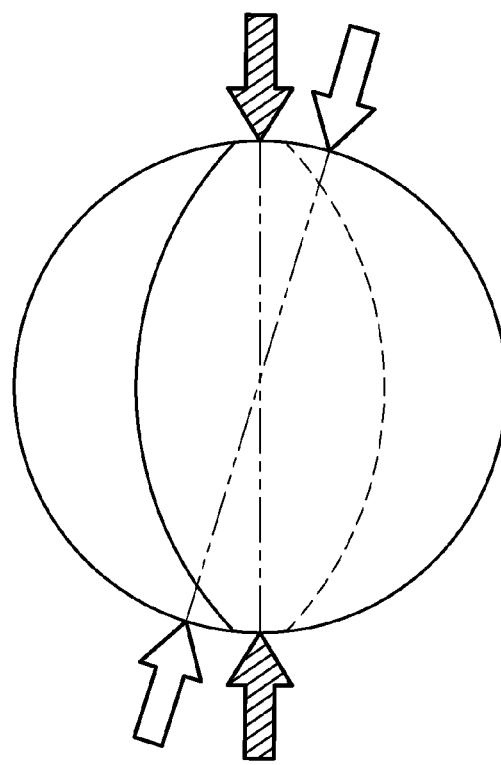
FIG. 11 is a conceptual schematic drawing illustrating a fifth alternative embodiment of a multi-fuel construction for a compression-ignited opposed-piston engine.

The principles underlying the multi-fuel, compression-ignition, opposed-piston engine described thus far can be applied in many variations, including those described below, and, possibly, others. The figures illustrating these alternate embodiments schematically show, in the manner of FIG. 4, a planar section orthogonal to the collinear axes of the opposed pistons in a ported cylinder that passes through a combustion chamber formed between two opposed pistons. The two opposed pistons can be constructed as shown in FIGS. 2A and 2B herein, which together form a combustion chamber having a particular shape. However, this is not meant to exclude other opposed piston constructions which together form differently-shaped combustion chambers. For example, the two opposed pistons can be constructed as shown in FIGS. 3A-3D of WO 2012/158756, as shown in FIG. 11 in US 2011/0271932, as shown in FIGS. 5, 9, and 10 of U.S. Ser. No. 13/843,686, or equivalents thereof. In the figures illustrating the alternate embodiments, the combustion chamber configuration is outlined by a pair of curved lines defining a generally combustion chamber shape with open ends that is circumscribed by a circle representing surrounding structure including the piston peripheries and a cylinder liner. Preferably, but not necessarily, the combustion chamber has a generally ellipsoidal (or equivalent) shape with open ends.

As per FIGS. 7A and 7B, a dual-fuel construction for a compression-ignition, opposed-piston engine includes a pair of radially-opposed diesel main injectors and an NG main injector paired with a radially-opposed pilot injector. Presuming that the injection ports for all injectors are located on the cylinder at or near the TC locations of the pistons, the ports are disposed in a circumferential array. Each pair is generally aligned along an injection axis. Tradeoffs for combustion chamber and piston design include shifting the axis of the diesel main injectors, which allows for changing the width (W) of the combustion chamber.

Figure 8:
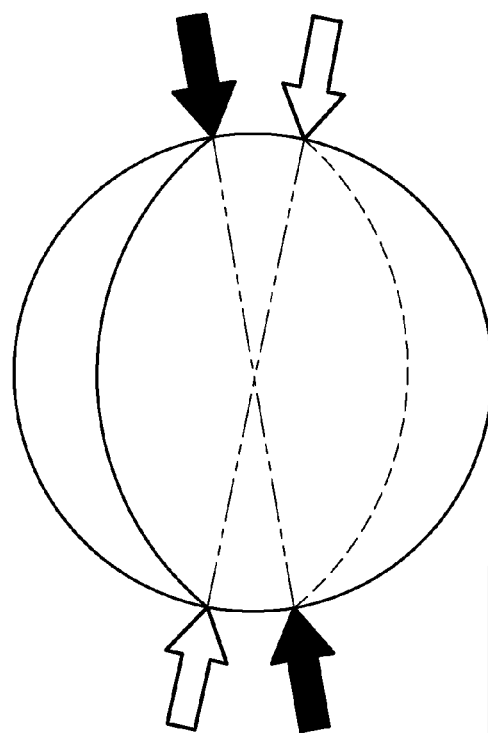
FIG. 8 is a conceptual schematic drawing illustrating a second alternative embodiment of a multi-fuel construction for a compression-ignited opposed-piston engine.

As per FIG. 8, a dual-fuel construction for a compression-ignition, opposed-piston engine includes two radially-opposed diesel main injectors and two radially-opposed NG main injectors. This is desirable for allowing either fuel to fully power the engine, depending on engine operating conditions. This construction also allows injection any time in the compression stroke, with less constraint on combustion chamber and piston geometry. It should be noted that when the main charge is gaseous fuel, the diesel main diesel injectors are operated to provide the means for igniting the NG mixture when running on natural gas alone or to provide full power capability when running on diesel alone. That is, either or both of the main diesel injectors can be operated to provide a short diesel pilot burst or a full main diesel injection.

As per FIG. 9 a dual-fuel construction for a compression-ignition, opposed-piston engine includes two radially-opposed diesel main injectors and a single dual nozzle injector which allows for NG main injection and diesel pilot injection from a single location. This construction allows variation in the combustion chamber width.

As per FIGS. 10A and 10B, a dual-fuel construction for a compression-ignition, opposed-piston engine includes a diesel main injector paired with a radially-opposed diesel main/pilot injector, and an NG main injector. The diesel main/pilot injector is, preferably, a dual-nozzle device in which one nozzle is sized for diesel main injection and the other for diesel pilot injection. In FIG. 10A, the width of the combustion chamber openings is wider than in FIG. 10B. With the construction of FIG. 10A, all of the main injectors can operate throughout the compression stroke. The narrower widths in FIG. 10B limit the potential operating time of the NG main injector to some crank angle preceding minimum volume.

As per FIG. 11, a dual-fuel construction for a compression-ignition, opposed-piston engine includes two radially-opposed diesel main/pilot injectors and two radially-opposed NG main injectors. As with the construction of FIG. 10B, all of the narrower widths of the combustion chamber openings limit the potential operating time of the NG main injectors to some crank angle preceding minimum volume.

Figure 12:
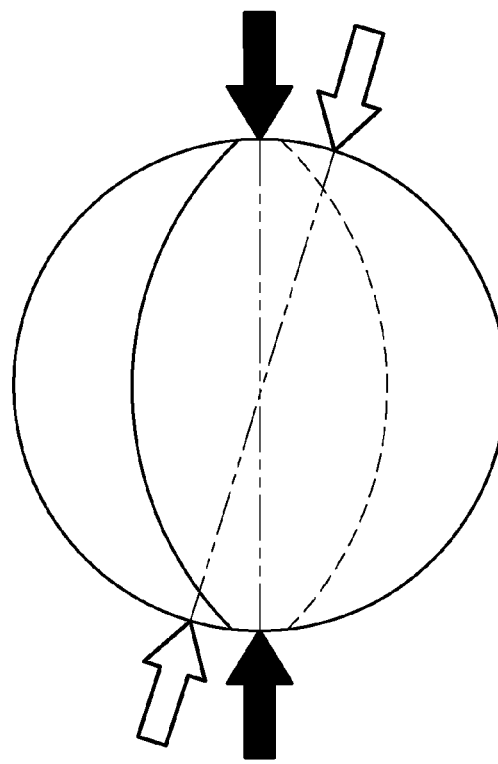
FIG. 12 is a conceptual schematic drawing illustrating a sixth alternative embodiment of a multi-fuel construction for a compression-ignited opposed-piston engine.

As per FIG. 12, a dual-fuel construction for a compression-ignition, opposed-piston engine includes two radially-opposed diesel main injectors and two radially-opposed NG main injectors. It should be noted that, when the main charge is gaseous fuel, the diesel main diesel injectors are designed to provide the means for igniting the NG mixture when running on natural gas alone or to provide full power capability when running on diesel alone. That is, the main diesel injectors are designed to provide a short burst or can be controlled to provide a full pure diesel injection.

Figure 13A:
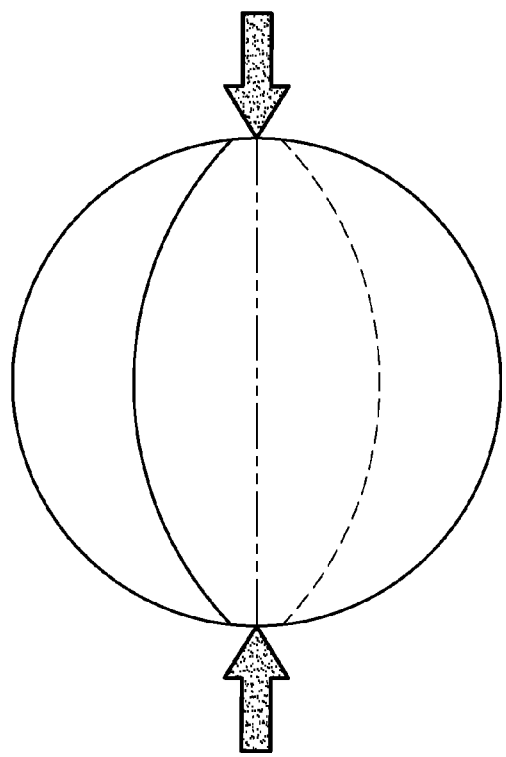
FIGS. 13A and 13B are conceptual schematic drawings illustrating a seventh alternative embodiment of a multi-fuel construction for a compression-ignited opposed-piston engine.
Figure 13B:
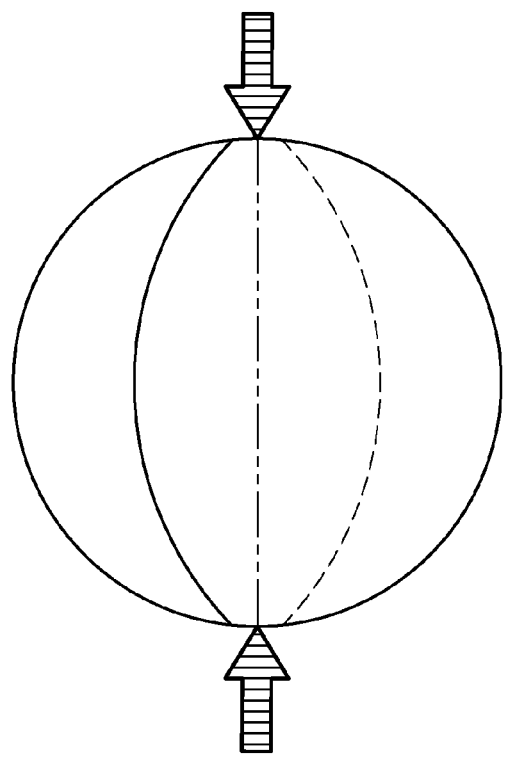

As per FIGS. 13A and 13B, a dual-fuel construction for a compression-ignition, opposed-piston engine includes a pair of radially-opposed multi-function injectors. In FIG. 13A, the construction includes two radially-opposed combined diesel and NG main (dual-fuel) injectors; this construction minimizes the intrusion into the combustion chamber by multiple injectors. In FIG. 13B, the two injectors include a third small nozzle for pilot injection of diesel fuel to ignite the natural gas mixture. Both of these constructions will allow the engine to run full load on either diesel or NG; depending on the application a dedicated smaller pilot injection is available to be able to achieve the 95% NG replacement limit (5% diesel and 95% NG). In both of these constructions, NG can be injected throughout the compression stroke, thus inflicting no constraints on the combustion chamber and piston constructions.

As per FIGS. 14A and 14B, a dual-fuel construction for a compression-ignition, opposed-piston engine includes a diesel main injector paired with a radially-opposed multi-function injector. In FIG. 14A the diesel main diesel injector is paired with a combined diesel and NG main injector that reduces cost and simplifies construction. Full engine load would be achieved with both diesel and NG in this construction embodiment. For cost reduction or simplification, the combined diesel and NG main injector is only on one side of the combustion chamber. In the construction of FIG. 14B, a third, small, nozzle is added to the combined injector so as to provide for a pilot injection to ignite the natural gas mixture.

As per FIGS. 15A and 15B, a dual-fuel construction for a compression-ignition, opposed-piston engine includes an NG main injector paired with a radially-opposed diesel injector. FIG. 15A shows a simple cost effective construction wherein two injectors, a main diesel and a main NG injector oppose each other in the combustion chamber. This construction allow for full load operation with either a pure diesel fuel mixture or all natural gas mixture. It should be noted that, when the main charge is gaseous fuel, the diesel main diesel injector is designed to provide the means for igniting the NG mixture when running on natural gas alone or to provide full power capability when running on diesel alone. That is, the main diesel injector is designed to provide a short burst or can be controlled to provide a full pure diesel injection. FIG. 15B shows a two-injector configuration using a main NG injector and an opposing diesel pilot injector. Full load operation can only be achieved with NG in this configuration because the diesel pilot would not provide the flow rate necessary to meet full load fuel requirements.

Further Alternatives

A main charge of NG or diesel fuel can be injected in a radial or a tangential direction with respect to the cylinder bore, and, further, can be injected in a longitudinal direction toward one of the intake and exhaust ports. A pilot charge of diesel fuel can be injected in a direction along or across a line of symmetry of the combustion chamber.

This specification and the accompanying drawings are for illustrative purposes only, and should not be construed to narrow the breadth of the disclosure in any way. Those skilled in the art will appreciate that various modifications might be made to the disclosed embodiments without departing from the full and fair scope and spirit of this disclosure. Furthermore, other aspects, features and advantages of the described subject matter will be apparent upon an examination of the attached drawings and appended claims.

The invention claimed is:

1. A multi-fuel opposed-piston engine, comprising:
 a cylinder with a bore, an intake port, and an exhaust port, the intake port and the exhaust port being spaced apart and located at respective ends of the cylinder;
 a pair of pistons slidably disposed within the cylinder for opposing movement between respective bottom center and top center locations;
 each piston of the pair of pistons having an opposing end surface constructed to form a combustion chamber, the combustion chamber formed by the opposing end surfaces having a generally ellipsoidal shape for promoting turbulent bulk air motion when the pair of pistons are near the top center locations during a compression stroke of the engine, each opposing end surface having diametrically opposed notches formed in a periphery of the opposing end surface so as to define a line of symmetry of the combustion chamber;
 a pair of gaseous fuel injectors communicating with the bore of the cylinder through first injection ports at first diametrically opposed injector sites within the cylinder and between the pair of pistons, wherein the pair of gaseous fuel injectors are positioned to inject gaseous fuel in opposing radial directions of the bore of the cylinder transverse to the line of symmetry;
 a pair of liquid fuel injectors communicating with the bore of the cylinder through second injection ports at second diametrically opposed injector sites within the cylinder and between the pair of pistons, wherein the pair of liquid fuel injectors are positioned to inject liquid fuel in opposing radial directions of the bore of the cylinder aligned with the line of symmetry; and
 a fuel injection system operatively connected to an engine control unit, the fuel injection system comprising:
 a gaseous fuel system coupled to the pair of gaseous fuel injectors and operable to cause the pair of gaseous fuel injectors to inject a main charge of gaseous fuel during a first crank angle window of the compression stroke so as to create a mixture of the main charge of gaseous fuel and charge air, the injection of the main charge of gaseous fuel taking place after both the intake port and the exhaust port have been closed by the pair of pistons as the pair of pistons transition from the bottom center locations toward the top center locations, and
 a liquid fuel system coupled to the pair of liquid fuel injectors and operable to cause the pair of liquid fuel injectors to inject a pilot charge of liquid fuel during a second crank angle window of the compression stroke so as to facilitate an ignition of the mixture of the main charge of gaseous fuel and charge air, the injection of the pilot charge of liquid fuel taking place as the pair of pistons pass through the top center locations.

2. A method of operating the multi-fuel opposed-piston engine of claim 1, the method comprising:
 introducing charge air through the intake port and into the cylinder between the pair of pistons;
 moving the pair of pistons toward each other during a compression stroke of the engine;
 injecting a main charge of gaseous fuel into the cylinder between the pair of pistons, wherein the main charge of gaseous fuel is injected in opposing radial directions of the bore of the cylinder transverse to the line of symmetry of the combustion chamber through the first injection ports at first diametrically opposed injector sites within the cylinder during a first crank angle window of the compression stroke so as to create a mixture of the main charge of gaseous fuel and charge air as the pair of pistons transition from respective bottom center locations toward respective top center locations;
 compressing the mixture of the main charge of gaseous fuel and charge air in response to the movement of the pair of pistons toward each other during the compression stroke;
 forming a generally ellipsoidal-shaped combustion chamber constructed from the opposing end surfaces of each piston to contain the compressed mixture of the main charge of gaseous fuel and charge air as the pair of pistons approach the top center locations; and
 injecting a pilot charge of liquid fuel into the cylinder between the pair of pistons, wherein the pilot charge of liquid fuel is injected in opposing radial directions of the bore of the cylinder aligned with the line of symmetry of the combustion chamber through the second injection ports at second diametrically opposed injector sites within the cylinder during a second crank angle window of the compression stroke so as to facilitate an ignition of the compressed mixture of the main charge of gaseous fuel and charge air as the pair of pistons pass through the top center locations.

3. The method of claim 2, wherein the combustion chamber formed has an elongated semi-ellipsoidal shape having an axis that is collinear to the line of symmetry of the combustion chamber.

4. The method of claim 2, wherein injecting the main charge of gaseous fuel during the first crank angle window of the compression stroke takes place after both the intake port and the exhaust port have been closed by the pair of pistons as the pair of pistons transition from the bottom center locations toward the top center locations.

5. The method of claim 4, wherein injecting the pilot charge of liquid fuel during the second crank angle window of the compression stroke takes place at a crankshaft angle that precedes a minimum combustion chamber volume.

6. The method of claim 2, wherein injecting the main charge of gaseous fuel during the first crank angle window of the compression stroke begins after both the intake port and the exhaust port have been closed by the pair of pistons as the pair of pistons transition from the bottom center locations toward the top center locations, and ends at a crankshaft angle that precedes a minimum combustion chamber volume.

7. The method of claim 6, wherein injecting the pilot charge of liquid fuel during the second crank angle window of the compression stroke takes place at a crankshaft angle that precedes a minimum combustion chamber volume.

8. The method of claim 2, wherein injecting the pilot charge of liquid fuel during the second crank angle window of the compression stroke takes place at a crankshaft angle that precedes a minimum combustion chamber volume.

* * * * *